United States Patent
Mahabir et al.

(10) Patent No.: US 7,255,134 B2
(45) Date of Patent: Aug. 14, 2007

(54) CARBON BLACK-CONTAINING CROSSLINKED POLYETHYLENE PIPE HAVING RESISTANCE TO CHLORINE AND HYPOCHLOROUS ACID

(75) Inventors: Carl M. Mahabir, Streetsboro, OH (US); Arthur L. Backman, Broadview Heights, OH (US); Girish T. Dalal, Avon Lake, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 215 days.

(21) Appl. No.: 10/618,556

(22) Filed: Jul. 11, 2003

(65) Prior Publication Data

US 2004/0020547 A1 Feb. 5, 2004

Related U.S. Application Data

(60) Provisional application No. 60/397,799, filed on Jul. 23, 2002.

(51) Int. Cl.
*F16L 11/04* (2006.01)

(52) U.S. Cl. .............. 138/137; 138/141; 428/36.91

(58) Field of Classification Search .......... 138/137, 138/141; 428/36.91
See application file for complete search history.

(56) References Cited

U.S. PATENT DOCUMENTS

| | | | | |
|---|---|---|---|---|
| 2,916,481 A | * | 12/1959 | Gilmont ................ 525/387 |
| 3,033,238 A | * | 5/1962 | Kosewicz .............. 138/141 |
| 3,096,210 A | * | 7/1963 | Boonstra ............... 428/368 |
| 3,292,539 A | * | 12/1966 | Behr et al. ............ 102/466 |
| 4,087,946 A | * | 5/1978 | Harris .................... 52/105 |
| 4,101,699 A | * | 7/1978 | Stine et al. ........... 428/36.91 |
| 4,117,195 A | | 9/1978 | Swarbrick et al. ..... 428/379 |
| 4,614,208 A | | 9/1986 | Skarelius ............... 138/103 |
| 5,756,023 A | | 5/1998 | Stachowiak ............. 264/83 |
| 6,098,666 A | * | 8/2000 | Wells et al. ........... 138/115 |
| 6,176,269 B1 | | 1/2001 | Jarvenkyla ............ 138/143 |

(Continued)

FOREIGN PATENT DOCUMENTS

EP 1199161 4/2002

(Continued)

OTHER PUBLICATIONS

Standards Australia, AS 2492-(1994)"Cross-Linked Polyethylene (PE-X) Pipe For Hot and Cold Water Applications", pp. 5-28.

(Continued)

*Primary Examiner*—James Hook
(74) *Attorney, Agent, or Firm*—Joe A. Powell; Samuel B. Laferty; Thoburn T. Dunlap

(57) ABSTRACT

Pipe or tubing of crosslinked polyethylene ("PEX") containing less than 2% by wt. carbon black provides improved resistance to oxidizing agents such as chlorine and hypochlorous acid in water. The pipe may be further protected with a thin tubular core (inner layer) of high density polyethylene or chlorinated polyethylene. The pipe may optionally have an oxygen barrier layer, such as poly(ethylene-co-vinyl alcohol) ("EVOH"), contiguously disposed radially outward from the carbon-containing PEX layer. The pipe is suitable for potable water applications and for hot water radiant heating systems.

10 Claims, 2 Drawing Sheets

U.S. PATENT DOCUMENTS

| | | | |
|---|---|---|---|
| 6,197,852 B1 | 3/2001 | Lee | 524/93 |
| 6,284,178 B1 | 9/2001 | Russell et al. | 264/211.24 |
| 6,361,842 B1* | 3/2002 | Stachowiak | 428/35.7 |
| 6,376,595 B1 | 4/2002 | Palmlof | 524/495 |
| 6,422,269 B1* | 7/2002 | Johansson et al. | 138/137 |
| 6,615,877 B2* | 9/2003 | Zimmer et al. | 138/137 |
| 2002/0189697 A1 | 12/2002 | Jarvenkyla | 138/127 |
| 2004/0028860 A1* | 2/2004 | Dalal et al. | 428/36.91 |
| 2004/0045619 A1* | 3/2004 | Backman et al. | 138/137 |

FOREIGN PATENT DOCUMENTS

| | | |
|---|---|---|
| GB | 2170206 | 7/1986 |
| WO | WO9949254 | 9/1999 |
| WO | WO9957474 | 11/1999 |

OTHER PUBLICATIONS

Cabot Corporation, Technical Report—S-115, Dec. 2000, "The Role of Carbon Black Morphology In Reducing UV Oxidation Of Linear Low Density Polyethylene Films", pp. 1-11.

Cabot Corporation, Technical Report—S-131, Dec. 2002, "Carbon Black Dispersion", pp. 2-16.

* cited by examiner

CARBON BLACK-CONTAINING CROSSLINKED POLYETHYLENE PIPE HAVING RESISTANCE TO CHLORINE AND HYPOCHLOROUS ACID

CROSS-REFERENCE TO RELATED APPLICATION

This application is filed pursuant to Provisional Application No. 60/397,799 filed on 23 Jul. 2002.

FIELD OF THE INVENTION

This invention relates to crosslinked polyethylene ("PEX") tubing or "pipe" having improved resistance to chlorine and hypochlorous acid ("HOCl") contained in potable water. The pipe is for use in potable water distribution piping systems, and in hot water heating systems, such as radiant heating systems. The susceptibility to degradation by reaction with free chlorine present in potable water is described in an article titled "Chlorine Resistance Testing of Cross-linked Polyethylene Piping Materials" by P. Vibien, et al. of Jana Laboratories Inc., Ontario, Canada, and W. Zhou et al. of University of Illinois at Chicago, Chicago, Ill., U.S.A.

The Problem

Polyethylene ("PE") piping is commonly used for cold (10° C.-35° C.) water systems for potable water, irrigation at high pressure in the range from about 650 kPa (80 psig) to 1490 kPa (200 psig), and drainage waste water, a choice of LLDPE (linear low density PE), MDPE (medium density PE) or HDPE (high density PE) being directed by the conditions of usage of the pipe. Cross-linked PE ("PEX pipe") is used for domestic cold and hot water (10° C.-115° C.) as well as in radiant heating applications. Water at temperatures above 100° C., under pressure in the range from about 997 kPa (130 psig) to about 1135 kPa (150 psig), will rupture the pipe. Damage due to chlorine and hypochlorous acid in water has been found to be as damaging to PEX from within the pipe, as oxygen or other oxidizing agents, if not more so. The goal is to protect the PEX pipe against oxidative damage for a long time, up to about 50 years.

BACKGROUND OF THE INVENTION

Plastic tubing denotes a particular diameter schedule of plastic pipe in which the outside diameter of the tubing is equal to the nominal size plus 3.175 mm or 0.125" (inch). Plastic pipe outside diameter schedule conforms to ANSI B 36.10. For convenience, and in deference to common usage, plastic tubing having a nominal diameter in the range from 7 mm to 152 mm is referred to hereinafter as "pipe".

ASTM D3350 Section 2 dictates that for adequate protection against ultraviolet (or "u-v") radiation, PE pipe contain a minimum of 2 weight percent carbon black. Consequently, commercially available PE pipe in a wide variety of specifications is made to contain at least 2% by weight ("wt.") carbon black, typically about 2.5% by wt. Because PEX pipe is typically covered up or buried in use, protection against u-v light is not a concern unless the pipe is to be exposed or stored outdoors for an extended period; PEX is therefore not generally protected against u-v light and does not contain any carbon black. During construction of structures, PEX pipe may be exposed to u-v light for up to 3 months, and in such instances, u-v protection is desirable.

PEX is conventionally crosslinked using one of several processes such as those disclosed in U.S. Pat. No. 4,117,195; U.S. Pat. No. 5,756,023 and U.S. Pat. No. 6,284,178. These crosslinking processes include addition of peroxide, addition of AZO compounds, electron beam irradiation, and addition of silane. Such crosslinking is known to enhance certain physical and chemical properties of the polyethylene. In particular, crosslinking has been shown to increase maximum useful temperature, reduce creep, improve chemical resistance, increase abrasion resistance, improve memory characteristics, improve impact resistance, and improve environmental stress crack resistance of polyethylene materials.

Though PEX has the foregoing good properties, PCT publication WO 99/49254 teaches protecting it exteriorly with an oxygen barrier layer; and U.S. Pat. No. 4,614,208 discloses a multilayer PEX pipe having an intermediate layer of oxygen diffusion resistance material and an outer layer of impact resistant polyethylene; the specific problem of protecting PEX pipe against attack by chlorine and HOCl in potable water has, to date, been ignored.

It is well recognized that PEX needs to be protected from oxidative degradation, but it is also well known that chlorine and hypochlorous acid (HOCl) are just as detrimental to PEX pipe as oxidizing agents such as oxygen, sulfur dioxide and oxides of nitrogen in the atmosphere, if not more so. Usually, antioxidants are added to protect the PEX materials from oxygen entering the material from the atmosphere. When PEX is used for piping in water distribution systems, oxidative degradation occurs not only from the oxygen in the atmosphere but also from oxidizing agents migrating from water inside the pipe. Oxidizing agents in the water, such as chlorine and HOCl are more detrimental to the PEX pipe than oxidizing agents in the atmosphere and such antioxidants as are used to protect the PEX pipe are consumed quickly when subjected to strong oxidizing agents such as chlorine and HOCl; in particular, the effectiveness of the antioxidants is diminished when the PEX pipe is exposed to u-v light. Moreover, large amounts of antioxidants cannot be used due to strict potable water extraction standards.

If one was to recognize the importance of protection not only from outside the pipe but also from within, it is evident that an effective solution would be to have a more effective antioxidant or antidegradant incorporated in the PEX. But, there is no suggestion in the art what material or "dopant" would provide such properties. Further, there is no suggestion that, should such dopant be used, and its effectiveness is to be enhanced, such enhancement might be obtained with an inner tubular core of oxidation-resistant material having a wall of thin cross-section in the range from as thin as 0.025 mm (1 mil) for 7 mm (0.25") nominal diameter pipe, to 1.52 mm (0.06") thick for 152 mm (6") nominal diameter pipe. Nor is there any suggestion that such inner core be cohesively bondable to carbon-doped PEX, and co-extrudable in such a thin cross-section under substantially the same extrusion conditions as carbon-doped PEX.

From the foregoing, it will be evident that the problem of coping with degradation of PEX pipe is addressed in diverse ways, few of which are focused on the detrimental long term effects of chlorine deliberately added to water. The effectiveness of carbon black as a dopant in PEX pipe no greater than 152 mm in nominal diameter, optionally reinforced with an inner tubular of thin-walled core of high density polyethylene ("HDPE") or chlorinated PE is judged by its resistance to degradation by chlorine and HOCl in water at elevated temperature above about 80° C., and elevated pressure above about 274 kPa (25 psig) over a long period of time more than 20 years.

SUMMARY OF THE INVENTION

Protection of PEX pipe against degradation by chlorine and HOCl present in water flowing through the pipe is contraindicated when it was found that carbon black present in a minimum amount of 2% by wt. in PEX appears to be attacked by chlorine and HOCl present in potable water flowing through the pipe, causing it to have only about one-half the test life retention as PEX in which there is no carbon black (see Table I below). Upon further testing however, it has been discovered that if a critically low concentration of carbon black, less than 2% by wt., is present in PEX, preferably in the range from about 0.1% to 1.75% by wt., more preferably from about 0.4% to about 1.25% by weight, the length of service of the pipe is unexpectedly extended beyond that of conventionally used PEX free of carbon black, or of PEX containing 2% by wt. carbon black, after exposure to u-v radiation.

The PEX pipe may be extruded or otherwise thermoformed (i) from carbon black-containing ("carbon doped") PEX only, so as to have a wall of a single layer (or "unilayer") of carbon-doped PEX; or (ii) the wall may be formed from successive melt-bonded multiple layers of PEX one of which is carbon-doped; or, (iii) either of the foregoing walls may additionally include the wall of a protective inner tubular core or "liner" of a thermoplastic oxidation resistant synthetic resinous material melt-bondable to the carbon-doped PEX, a preferred liner material being selected from a chlorinated polyethylene and a high density polyethylene ("HDPE"), provided the wall thickness of the core is less than 1.52 mm (0.06") for the largest nominal diameter PEX pipe to be made, namely 152 mm (6"). HDPE has a density in the range from 0.941 to 0.963 g/cc, preferably from 0.946 to 0.963 g/cm$^3$, and more preferably from 0.950 to 0.963 g/cm$^3$. The chlorinated PE has a chlorine content in the range from 5 to about 50% by wt.

A multilayered pipe having a carbon-doped PEX wall and a tubular inner core having a wall 10 times or more thinner than the carbon-doped PEX wall, provides excellent protection against degradation from chemicals in water carried in the pipe. For all unilayer carbon-doped PEX pipe no greater than 152 mm (6") in nominal diameter, the minimum and maximum wall thickness is determined by ASTM F 877-02 or an applicable equivalent foreign piping code. For applications other than hot and cold water distribution, the minimum and maximum wall thickness is determined by appropriate code.

For non-SDR-9 (standard diameter ratio) pipe having a nominal diameter of 7 mm (0.25") and 10 mm (0.375") the ratio of the specified nominal diameter to the maximum wall thickness of inner tubular HDPE core is 28 for 7 mm pipe, and 40 for 10 mm pipe the minimum wall thickness of PEX being 1.57 mm for 7 mm pipe, and 1.78 mm for 10 mm pipe. For SDR-9 pipe having a nominal diameter in the range from 13 mm (0.5") to 152 mm (6") the ratio of the specified nominal diameter to the maximum wall thickness of the inner tubular HDPE core is in the narrow range from 52 to 100, the minimum wall thickness of PEX being 1.78 mm for 13 mm pipe and 17.29 mm for 152 mm pipe.

A process is disclosed for producing a carbon-doped PEX pipe suitable for multiple water distribution systems in which the PEX is crosslinked using peroxide additives, a silane grafting method, or AZO compounds, or by exposing the pipe to electron beam irradiation. The silane grafting method is the most preferred method of crosslinking to manufacture the carbon-doped PEX pipe.

A single-step process for forming a multilayer PEX pipe having at least two layers (twin-layered pipe) yields carbon-doped PEX pipe having an inner tubular core of protective polymer having a wall thickness in the range from about 28 to 100 times smaller than the nominal diameter of pipe in the range from 7 mm (0.25") to 152 mm (6"), the smallest ratio (28) being attributable to the smallest diameter non-SDR-9 piping (7 mm or 0.25") and the largest (100) being attributable to the largest diameter SDR-9 pipe generally made, provided the doped PEX and protective polymer are co-extrudable under similar temperature conditions, that is, within 50° C. of one another. This thin annular core of protective polymer provides improved resistance to attack by oxidation agents such as chlorine and hypochlorous acid without significantly decreasing the hoop stress of the multilayered pipe, that is, the hoop stress decreases less than 15% relative to conventionally used PEX alone. The thin annular core of protective polymer is critically related to the overall wall thickness of multilayered PEX pipe to be made, as it must necessarily conform to a requirement of wall thickness for the PEX alone. This thickness is specified by piping codes, and the cross-section of the thin annular layer is required to be substantially uniform, that is, have less than a ±0.05 mm variance in wall thickness for pipe in the range from 13 mm to 51 mm nominal diameter.

Though a core of HDPE which is not crosslinked is effective, crosslinked HDPE is equally effective provided it is not so heavily crosslinked as to be non-extrudable in the single-step process used herein. If desired, HDPE may be heavily crosslinked after the pipe is formed, for example, by irradiating with an electron beam of suitable intensity; the resulting heavily crosslinked pipe may then be formed into a twin-layered pipe in a two-step process in which the crosslinked HDPE pipe is advanced as a sleeve into a die in which PEX is extruded over the HDPE, provided the relative inflexibility of the pipe is acceptable.

These and other objects are achieved by using a PEX composition having from 0.1 to about 1.75% by wt. carbon black, preferably from about 0.25 to about 1.5%, and most preferably from about 0.40 to about 1.25% by wt. carbon black.

BRIEF DESCRIPTION OF THE DRAWINGS

The foregoing and additional objects of the invention will best be understood by reference to the following detailed description, accompanied with schematic illustrations of preferred embodiments of the invention, in which illustrations like reference numerals refer to like elements.

DETAILED DESCRIPTION OF THE PREFERRED EMBODIMENTS

Figure 1:
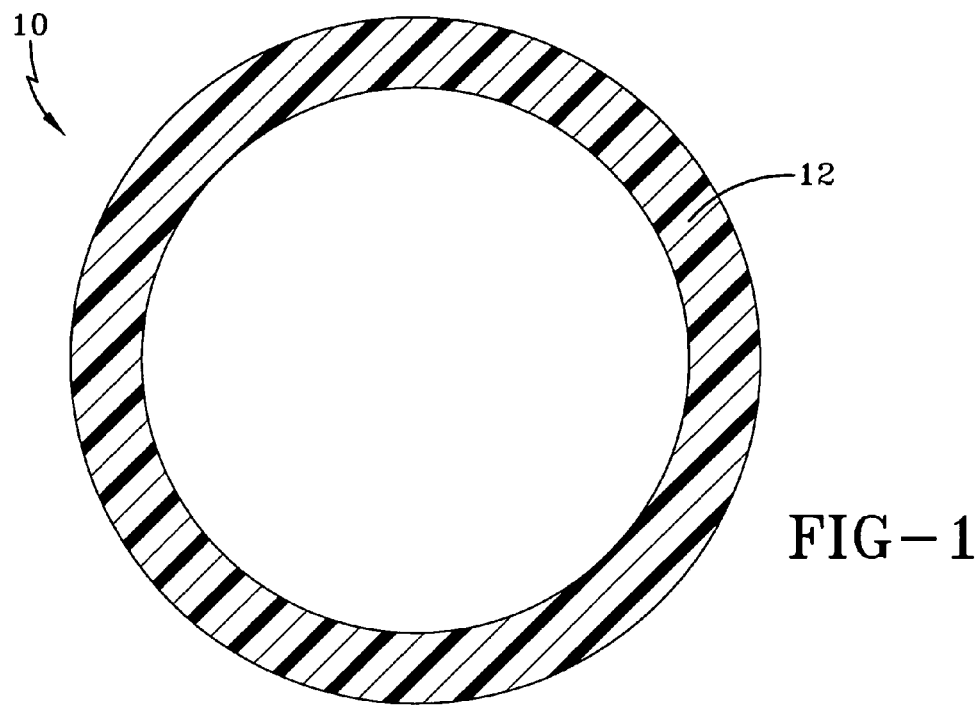
FIG. 1 is a cross-sectional view not to scale, of carbon-doped PEX pipe having a wall thickness specified by a piping code (ASTM F 876 and F 877).

In each embodiment described herein, whether the pipe is unilayer, or plural layers of PEX one of which is doped, the wall thickness of the doped PEX pipe meets the minimum wall thickness requirement of the piping code; therefore in all cases, PEX, is the major component of the pipe.

PEX Composition

It is critical that the PEX be doped with less than 2% by wt. of carbon black. Though as little as 0.1% by wt. exhibits an improvement in oxidative resistance of the pipe, a level of from 0.25 to about 1.5% by wt. is preferred. For typical commercial applications, a level of from about 0.40 to about 1.25% by wt. is most preferred. The particular carbon black used in the PEX composition is preferably a small particle size black, exemplified by carbon black having a particle size less than 27 nm (nanometers), preferably less than 22 nm and more preferably less than 20 nm. Such carbon blacks preferably have a dibutyl phthalate (DBP) absorption value greater than 65 cc/100 g, more preferably greater than 100 cc/100 g. Suitable commercially available carbon blacks include Vulcan® 9A32, Elftex TP, Black Pearls 700 and Black Pearls 800.

The carbon black is mixed with crosslinkable PE in normal thermoplastic compounding equipment, such as twin screw extruders, two-roll mills, or internal mixers such as Banbury mixers. Alternatively, the carbon black may be mixed with a masterbatch containing catalyst ("catalyst masterbatch") described below and added to the PEX as part of the catalyst masterbatch. The particular choice of mixing equipment is not critical as long as good dispersion of the carbon black in the PE is achieved. Dispersion can be determined by a thin film test. In this test, the carbon-doped PE can be extruded through a blown film apparatus or pressed into a thin film and the resultant film is placed over a light source and examined for the number of imperfections and the size of each. The uniformity of dispersed carbon particles in the carbon-doped PEX film may also be quantified by known microscopic techniques. Various methods for measuring the dispersion of particles in a polymer are well known to those skilled in the art of compounding polymers.

The PEX compound of this invention may be crosslinked by the addition of peroxide, addition of AZO compounds, or by using a silane grafted polyethylene and crosslinked by exposure to moisture. Electron beam irradiation crosslinking is not preferred for the pipe of this invention because the pipe would have depleted antioxidants as the irradiation would consume part of the antioxidants and thereby reduce the design performance of the pipe. A preferred process to crosslink the PE to a gel content of at least 65%, typically greater than 70% and more preferably in the range from 70% to 85%, is a silane grafting process known in the art as the Sioplas process. In the Sioplas process, a polyethylene resin is melted and silane, such as vinyltrimethoxysilane or vinyltriethoxysilane, is added to the melted polyethylene along with a catalyst, such as a peroxide initiator. Functional reaction sites are thereby grafted on polyethylene chains at which sites crosslinking will occur. Grafted resin is pelletized and stored for later use in containers to protect it from moisture, such as foil-lined bags.

A catalyst masterbatch for grafted resin typically includes a predetermined amount of crosslinkable PEX, an adequate amount of catalyst, such as a dibutyl tin dilaurate; a hindered phenol primary antioxidant, such as Irganox® 1010, 1076 and B215; secondary antioxidants, such as Irgafos® 168 and Irganox® PS 802, and optionally with fluorinated flow aids, such as Dynamar®. UV stabilizers, such as Tinuvin 111, and pigments such as titanium dioxide. Carbon black may also be included in the catalyst masterbatch. The catalyst masterbatch is typically pelletized for ease of mixing with the grafted resin in a conventional extruder.

The grafted resin and catalyst masterbatch are usually combined in a specific ratio, such as 96 wt. % grafted resin and 4 wt. % catalyst masterbatch, melted and mixed together and extruded. When the grafted polyethylene resin and catalyst masterbatch are mixed together, crosslinking of the polyethylene at the silane graft sites accelerates. The material exits the extruder and is typically cooled.

Pipe

Carbon-doped PEX pipe in water distribution systems for potable water which contains trace quantities in the range of 0.1 to 5 ppm of free chlorine, have both excellent u-v resistance and chlorine resistance and are designed to remain in service for about 50 years. The pipe may be used for supply lines for both hot and cold potable water and may be used for hot water heating systems, such as radiant heating.

The pipe may be a unilayer pipe of carbon-doped PEX, or multilayered. For example, the pipe may be two layers of PEX ("twin-layered"). Twin-layered pipe may include a relatively thick inner layer of carbon-doped PEX, and a relatively thin outer layer of undoped PEX color-coded with a color other than black. The combined thickness of the two layers meets the specifications of the applicable piping code.

A particularly preferred pipe is a three layer (trilayered) pipe having a relatively thin protective inner layer of a thermoplastic oxidation resistant synthetic resinous material, a relatively thick intermediate layer of carbon-doped PEX, and an outer layer of relatively thin oxidation-resistant material, the same or different from the material of the inner layer, the outer layer being color-coded other than black. The protective inner layer is preferably HDPE or other coextrudable thermoplastic such as chlorinated polyethylene which may be randomly or partially randomly chlorinated, or a blocky chlorinated polyethylene such as that disclosed in U.S. Pat. No. 6,124,406, the disclosure of which is incorporated by reference thereto as if fully set forth herein.

The invention can be better understood by referring to the drawings.

Referring to FIG. 1 is a cross-sectional view schematically illustrating a unilayer carbon-doped PEX pipe, indicated generally by reference numeral 10, in which is substantially uniformly dispersed a mass of carbon black particles forming a wall 12 of substantially uniform thickness.

Figure 2:
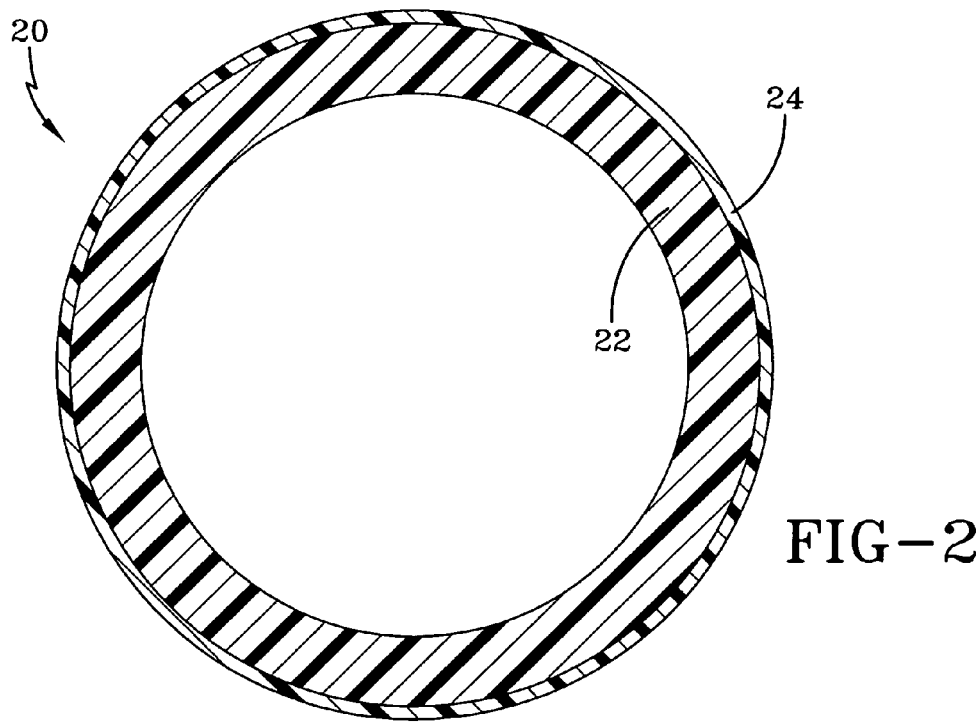
FIG. 2 is a cross-sectional view not to scale, of a two layer pipe having two layers of PEX, the inner tubular core being PEX containing less than 2% by wt. carbon black, to which core is melt-bonded an outer layer of thermoplastic synthetic resinous material, preferably PEX, which is free of carbon black and color-coded.

Referring to FIG. 2 is a cross-sectional view schematically illustrating a twin layered carbon-doped PEX pipe 20 having a relatively thick inner layer 22 of carbon-doped PEX and a relatively thin outer layer 24 of undoped PEX pigmented with a color other than black melt-bonded to the outer surface of the thick layer 22.

Figure 3:
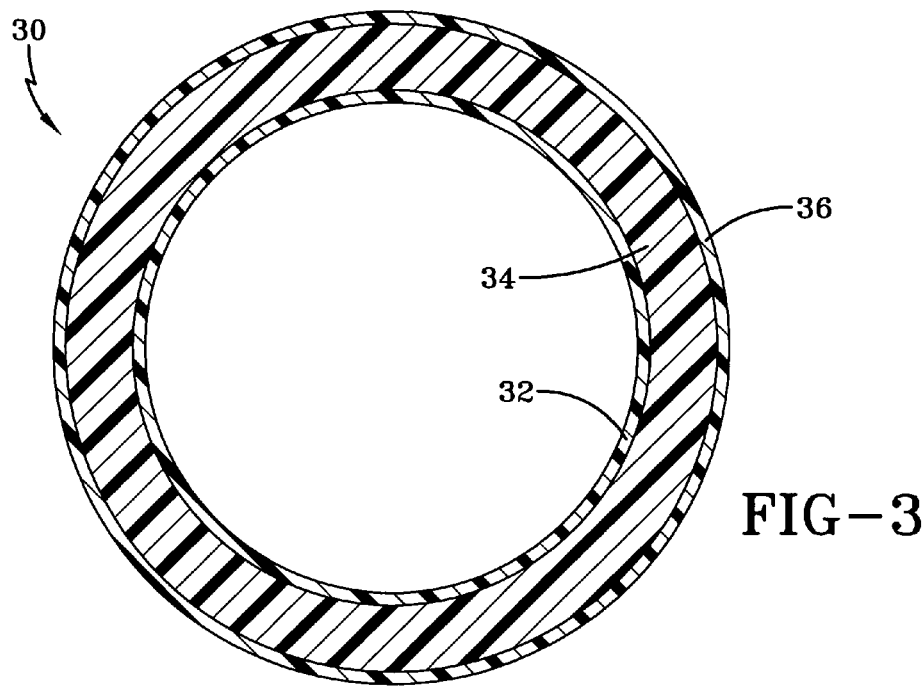
FIG. 3 is a cross-sectional view not to scale, of a three layer pipe having an inner tubular core of HDPE and successive inner and outer layers of PEX, the inner tubular core being doped PEX containing less than 2% by wt. carbon black, to which core is melt-bonded an outer layer of PEX free ("undoped") of carbon black and color-coded.

Referring to FIG. 3 is a cross-sectional view schematically illustrating a tri-layered pipe 30 having a relatively thin inner tubular core 32 of HDPE or chlorinated PE as a protective inner layer, a relatively thick intermediate layer 34 of carbon-doped PEX, and a relatively thin outer layer 36 of PEX which is pigmented with a color other than black.

The combined thickness of the three layers meets the specifications of the applicable piping code, the inner diameter of the inner core being no less than the specified minimum diameter of the pipe; and the combined thickness of the two PEX layers meets the minimum thickness specified for PEX pipe of the chosen nominal diameter.

The pipe of this invention, as shown in FIGS. 1-3, has a nominal diameter in the range of from about 7 mm (0.25 inch) to about 152 mm (6 inches) and a wall thickness in the range of from about 1.57 mm (0.062 inch) to about 17 mm (0.681 inch), respectively, as specified in ASTM F 876 and F 877. In multilayered pipe, the wall thickness of the tubular core 32 of FIG. 3 is preferably in the range from about 0.025 mm (1 mil) to about 0.5 mm (20 mils) depending upon the nominal diameter of the pipe. The nominal diameter of the pipe as well as the inner opening diameter is dictated by piping codes and thus the wall thickness is dictated by such codes.

The non-black outer layer 36 of PEX has a thickness of from about 0.05 mm (2 mils) to about 0.762 mm (30 mils). The outer layer 36 will have sufficient thickness to hide the black intermediate layer 34. Usually about 0.381 mm (15 mils) to about 0.762 mm (30 mils) is sufficient to hide the black layer. The thickness of the outer layer 36 required to hide the black layer will depend on the particular color of layer 36. For example, a red color will need a greater thickness to hide the black layer than will a blue color.

For applications where the pipe of this invention is used in heating systems, the pipe may have an additional layer of oxygen barrier material placed on the outside surface of the pipe. The purpose of the oxygen barrier material is to prevent oxygen from the atmosphere from entering the water being transported and thus damaging the boiler equipment. A suitable oxygen barrier materials are ethylene vinyl alcohol copolymers (EVOH). The EVOH can be attached to the pipe with an adhesive which is well known in the art. EVOH, when used as an outer layer for oxygen barrier, could also have an adhesive on the outside to protect the EVOH. U.S. Pat. No. 4,614,208 and PCT publication WO 99/49254 both teach methods to apply the barrier layer.

Process

Unilayer pipe is conventionally extruded as is multilayered pipe, using plural extruders, typically displaced 90° from each other, the extrudates from which are combined in a custom-designed die such as one commercially available from Rollepaal. Temperature of material in each of the plural zones along the longitudinal axial length of the die head is adjustable so as to gradually heat the tubular laminate being formed.

To co-extrude twin-layered pipe, a first extruder feeds into a first port in the die head to form an outer tubular layer, and a second extruder feeds into a second port in the die head to form an inner tubular core. From the second port, the inner core flows into distribution branches which are in open communication with an inner annular zone, and over a frustoconical mandrel. From the first port, the outer layer flows into distribution branches which are in open communication with an outer annular zone and over the inner layer flowing over the frustoconical mandrel. When the outer surface of the inner core contacts the inner surface of the outer tubular layer being formed, the twin-layered laminate is formed. The layers are melt bonded together such than no adhesive is required. The pipe is passed through sizing blocks as it is cooled below its melt temperature to retain its cylindrical shape and proper size. The field of co-extrusion is a well known art and for brevity will not be described further in this specification.

When using the Sioplas process of silane grafting, once the pipe is extruded, the crosslinking for the PEX layer(s) is completed to the desired level (usually about 70-85% gel level) by exposure to moisture. The exposure to moisture can be by atmosphere moisture (humidity) or crosslinking can be accelerated by using hot water or stream. In the description above, the material referred to as PEX may be partially crosslinked at the time of mixing and extruding but is crosslinked to the desired level after the pipe is formed.

The wall thickness of the tubular core inner layer of HDPE or chlorinated PE, measured in the radial direction, is preferably in the range from about 0.025 mm (1 mil), typically for small diameter pipe less than 25 mm nominal diameter, to about 0.50 mm (20 mils) for larger diameter pipe up to about 152 mm in nominal diameter.

The PEX pipe is continuously extruded, therefore of arbitrary length, which pipe is then coiled onto a large spool from which it is unwound and cut to a specified length; alternatively, the extrudate is cut into sections of desired length. The pipe may be assembled using standard crimp type fittings as are commercially available and well known in the art.

EXAMPLES

Examples 1 and 2 are presented below to illustrate the invention.

The PEX compound used in the Examples is made from a commercially available silane grafted (Sioplas process) polyethylene base resin, known as Flexet 5100 from AT Plastics, having a density of 0.945 g/cm$^3$ as measured according to ASTM D1505 and a melt index of 35 g/10 min. measured according to ASTM D1238 (190° C. and 21.6 Kg load). The silane grafted polyethylene base resin is mixed with a commercially available catalyst masterbatch, known as Flexet 728 from AT Plastics, having a melt index of 1.5 g/10 min. measured according to ASTM D1238 (190° C. and 2.16 Kg) a density of 0.935 g/cm$^3$ measured according to ASTM D 1505. The mixture contained 96% by wt. silane grafted PE and 4% by wt. catalyst masterbatch. The commercial catalyst masterbatch contains an antioxidant package. In the formulations which use carbon black, an 18 nm particle size carbon black (Vulcan® 9A32 from Cabot). The carbon black was added with the catalyst masterbatch.

Unilayer pipe made using the formulations were unilayer PEX pipe is extruded in a 2.5" Davis Standard single screw extruder equipped to extrude pipe in sizes from 7 mm (0.25") to 25 mm (1.0").

The extruded pipe is placed in a water bath set at 82° C. for 16 hours to further crosslink the PEX pipe. The final pipe has a greater than 70% gel content, as measured according to ASTM D2765.

Example 1

As stated above, if one uses the 2.0% by wt. minimum recommended level of carbon black in PEX, its resistance to oxidative degradation is less than the resistance of undoped PEX. When used at a lower level, the doped PEX shows very little deterioration in chlorine resistance while offering protection against both u-v light, chlorine and HOCl. Excellent results were obtained using 1.0 weight percent carbon black. Though, at present, it is not known at what carbon concentration the oxidative resistance begins to deteriorate rapidly, it is expected that excellent results will be obtained up to about 1.75% by wt. carbon black.

The following example is presented to show that 2.5% by wt. carbon black in a PEX pipe compound is detrimental to the performance of the pipe when chlorinated water is being transported in the pipe.

Two formulations were tested at two different temperatures, 115° C. and 105° C. The only difference in the formulations was that Formulation A (control) has no carbon black ("no C") and Formulation B has 2.5% by wt. carbon black ("2.5% by wt. C") added.

The two pipes, one with Formulation A and one with Formulation B, were evaluated for chlorine resistance at 115° C. and 105° C. The test procedure used is similar to the NSF P 171 Chlorine Protocol using modified conditions of 80 psi, pH of 6.5 and 3 ppm free chlorine. The test was first conducted at 115° C., then repeated at 105° C. The test data are shown below in Table I.

TABLE I

| PEX Formulation | Temp ° C. | Pressure Psi | % Test Life Retention vs. Control |
|---|---|---|---|
| A control (no C) | 115 | 80 | 100% |
| B (2.5% by wt. C) | 115 | 80 | 40% |
| A control (no C) | 105 | 80 | 100% |
| B (2.5% by wt. C) | 105 | 80 | 50.8% |

From the data in Table I, it can be seen that, at either temperature, 2.5% by wt. carbon-doped PEX (formulation B) has a more detrimental effect than no carbon black at all, when the pipe contains chlorinated water. When tested at 115° C., the carbon-doped pipe had only 40% of the test life of Formulation A which had no carbon black. When tested at a lower temperature, 105° C., the doped pipe had only 50.8% of the test life of the pipe with no carbon black in the formulation.

Example 2

This example is presented to show that 1% by wt. carbon-doped PEX provides better u-v resistance and better resistance to attack by chlorine than conventionally used PEX without any carbon black. Since it was already found that undoped PEX pipe had about twice as long an expected useful life compared with 2.5% by wt. carbon-doped PEX, it was more meaningful to compare undoped PEX with 1% by wt. carbon-doped PEX, each having first been exposed to varying lengths of accelerated exposure to u-v light.

Figure 4:
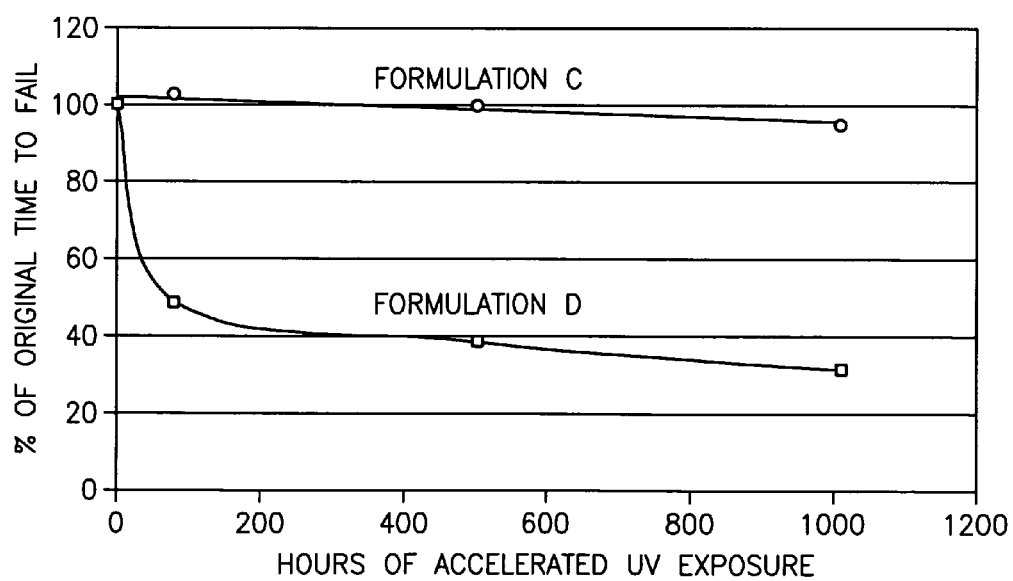
FIG. 4 is a graph showing the failure of PEX pipe without carbon black identified by Formulation D; and, the failure of PEX pipe doped with 1% by wt. carbon black, identified by Formulation C.

Pipe was made with Formulation C, namely PEX doped with 1.0% by wt. carbon black; other pipe of the same diameter is made with formulation D, namely undoped PEX. Both pipes are tested according to the NSF P 171 Chlorine Protocol at 70 psi pressure, 115° C. using continuously flowing pressurized water having a pH of 7.0 and a chlorine content of 4 ppm. The pipes were tested to failure after 0 hrs, 84 hrs, 500 hrs, and 1000 hrs exposure in the Weatherometer. For the accelerated exposure to u-v light, an Atlas Ci 65 Xenon arc Weatherometer was used with the following conditions: irradiance=0.35 w/m$^2$ @340 nm, 25% rain. The accelerated UV exposure was according to ISO 4892-2. The hours of testing to failure were measured. The data are shown in FIG. 4, expressed as percent of original time to failure. Original time to failure is the time required for pipe which has not been exposed to u-v light to fail under otherwise identical conditions.

From the graph in FIG. 4, it can be seen that Formulation C has a failure time essentially unchanged even after 1000 hours of accelerated UV exposure. Formulation D retains only 34% of its failure time performance after 1000 hours of UV exposure. This was quite unexpected in view of the data of Example 1 which shows 2.5% by wt. carbon black to be detrimental when the pipe is tested at 115° C. with water having a lower chlorine content, namely 3 ppm chlorine. These data show that PEX pipe is protected against degradation from u-v radiation while retaining its performance in the presence of water containing strong oxidizing agents, such as chlorine and hypochlorous acid, only with a low level of carbon black in the ranges stated herebefore, and specifically with only 1% by wt. carbon.

The PEX compositions having less than 2% by weight carbon black of this invention have been described as useful for making pipe. The compositions are also useful in many other applications where chlorine resistance is required. The compositions may be molded, extruded or formed in various shapes and used in end use applications where chlorine or hypochlorous acid is present. Such other uses may include wire insulation for electrical wiring in a chlorine environment and molded parts in swimming pools and spas.

Having thus provided a general discussion, described embodiments of the long-lived carbon-black doped PEX pipe and the overall process for making it, and illustrated the pipe with specific examples deemed to be best embodiments, it will be evident that the long-lived pipe has provided an effective solution to a pressing and persistent problem. It is therefore to be understood that no undue restrictions are to be imposed by reason of the specific embodiments illustrated and discussed, and particularly that this invention is not restricted to a slavish adherence to the details set forth herein.

What is claimed is:

1. A pipe of crosslinked polyethylene ("PEX") having a wall of substantially uniform thickness in the range from 1.78 mm to 17.29 mm having dispersed therein from 0.1 to about 1.25% by weight of carbon black having a particle size less than 27 nm (nanometers), and wherein said PEX is crosslinked by a method selected from the addition of AZO compounds and silane grafting process said pipe including, an inner tubular core of protective polymer selected from the group consisting of high density polyethylene ("HDPE") and chlorinated polyethylene ("CPE") contiguous with the inner surface of the crosslinked PEX, the core having a substantially uniform wall thickness in the range from 0.025 mm (1 mil) to 1.52 mm (0.06"), and a maximum wall thickness in the range from about 28 to 100 times smaller than the nominal diameter of the pipe in the range from 7 mm (0.25") to 152 mm (6"), ratio 28 being attributable to small diameter non-SDR-9 piping, and ratio 100 being attributable to the larger diameter SDR-9 pipe, wherein the HDPE has a density in the range from 0.941 g/cc to 0.963 g/cc, and the chlorinated polyethylene ("CPE") has a chlorine content in the range from 5 to about 50% by weight.

2. The pipe of claim 1 wherein the HDPE has a density in the range from about 0.950 to about 0.963 g/cm$^3$ and the PEX is crosslinked to a gel level of at least 65%.

3. The pipe of claim 1 wherein the inner core has a wall thickness in the range from at least 0.025 mm (1 mil) to about 1.52 mm (0.06") thick for pipe having a nominal diameter in the range from 7 mm (0.25") to 152 mm (6").

4. The pipe of claim 3 wherein the inner core has a wall thickness in the range from about 0.05 mm (2 mil) to 0.1 mm (4 mils) for pipe having a nominal diameter in the range from 13 mm (0.5") to 25 mm (1") and the gel level of PEX is greater than 70%.

5. The pipe of claim 1 wherein the PEX is crosslinked by a silane grafting process.

6. A pipe having successive inner and outer contiguous layers of crosslinked polyethylene (PEX) melt-bonded to one and another, and wherein said PEX is crosslinked by a method selected from the addition of AZO compounds and silane grafting process; and wherein said pipe having a wall of substantially uniform thickness in the range from 1.78 mm to 17.29 mm, and wherein said inner layer having dispersed therein from 0.1 to about 1.25% by weight of carbon black having a particle size less than 27 nm (nanometers); and wherein said outer layer being PEX free of carbon black and color-coded.

7. A tri-layered PEX pipe comprising:
   (a) an inner tubular core of protective polymer having a substantially uniform wall thickness at least 0.025 mm but no more than 1.52 mm, the protective polymer contiguous with the inner surface of a crosslinked PEX, the core having a substantially uniform wall thickness in the range from 0.025 mm (1 mil) to 1.52 mm (0.06"), and a maximum wall thickness in the range from about 28 to 100 times smaller than the nominal diameter of the pipe in the range from 7 mm (0.25") to 152 mm (6"), ratio 28 being attributable to small diameter non-SDR-9 piping, and ratio 100 being attributable to the larger diameter SDR-9 pipe, wherein the protective polymer is coextrudable with the PEX;
   (b) an intermediate tubular layer of crosslinked polyethylene (PEX) having a gel level of at least 65% and containing from 0.1% to about 1.25% by weight carbon black, the intermediate tubular layer contiguously disposed radially outward from the core; and,
   (c) an outer tubular layer of PEX free of carbon black, having a gel level of at least 65%, wherein said outer tubular layer of PEX is color-coded for installation in a chosen service.

8. The tri-layered pipe of claim 7 wherein the protective polymer is selected from the group consisting of high density polyethylene ("HDPE") and chlorinated polyethylene ("CPE"), the HDPE has a density in the range from 0.941 g/cc to 0.963 g/cc, and the chlorinated polyethylene ("CPE") has a chlorine content in the range from 5 to about 50% by weight.

9. A multilayer pipe comprising:
   (a) an inner tubular core of protective polymer having a substantially uniform wall thickness at least 0.025 mm but no more than 1.52 mm, the protective polymer contiguous with the inner surface of a crosslinked PEX, the core having a substantially uniform wall thickness in the range from 0.025 mm (1 mil) to 1.52 mm (0.06"), and a maximum wall thickness in the range from about 28 to 100 times smaller than the nominal diameter of the pipe in the range from 7 mm (0.25") to 152 mm (6"), ratio 28 being attributable to small diameter non-SDR-9 piping, and ratio 100 being attributable to the larger diameter SDR-9 pipe, wherein the protective polymer is coextrudable with the PEX;
   (b) an intermediate tubular layer of crosslinked polyethylene (PEX) having a gel level of at least 65% and containing from 0.1% to about 1.25% by weight carbon black, the intermediate tubular layer contiguously disposed radially outward from the core; and,
   (c) an oxygen barrier of material other than polyethylene disposed radially outward from said intermediate layer.

10. The multiplayer pipe of claim 9 wherein the protective polymer is selected from the group consisting of high density polyethylene ("HDPE") and chlorinated polyethylene ("CPE"), the HDPE has a density in the range from 0.941 g/cc to 0.963 g/cc, and the chlorinated PE has a chlorine content in the range from 5 to about 50% by weight.

\* \* \* \* \*